(12) United States Patent
Lee et al.

(10) Patent No.: US 10,712,592 B2
(45) Date of Patent: Jul. 14, 2020

(54) LIGHT SOURCE MODULE AND DISPLAY APPARATUS

(71) Applicant: Coretronic Corporation, Hsin-Chu (TW)

(72) Inventors: Chun-Wei Lee, Hsin-Chu (TW); Yu-Sung Lai, Hsin-Chu (TW); Sheng Chou, Hsin-Chu (TW); Han-Yuan Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 228 days.

(21) Appl. No.: 15/495,985

(22) Filed: Apr. 25, 2017

(65) Prior Publication Data

US 2018/0045989 A1 Feb. 15, 2018

(30) Foreign Application Priority Data

Aug. 12, 2016 (TW) .............................. 105125704 A

(51) Int. Cl.
*G02F 1/13* (2006.01)
*H04N 9/31* (2006.01)
(Continued)

(52) U.S. Cl.
CPC ............ *G02F 1/1323* (2013.01); *F21V 5/008* (2013.01); *F21V 7/0091* (2013.01); *F21V 7/04* (2013.01);
(Continued)

(58) Field of Classification Search
CPC .. G02F 1/1323; G02F 1/133615; F21V 5/008; F21V 14/06; F21V 13/04;
(Continued)

(56) References Cited

U.S. PATENT DOCUMENTS 7,261,429 B2 * 8/2007 Marchese ................ F21V 14/04
359/852
2010/0014022 A1 * 1/2010 Nagata .................. G02B 6/0025
349/62
(Continued)

FOREIGN PATENT DOCUMENTS

CN 2133006 5/1993
CN 2133006 Y * 5/1993
(Continued)

*Primary Examiner* — Erin Kryukova
(74) *Attorney, Agent, or Firm* — JCIPRNET

(57) ABSTRACT

A display apparatus including a display panel and a light source module is provided. The display panel displays an image frame according to a light beam. The light source module provides the light beam to the display panel. The light source module includes a light emitting device, a lens module, a reflection device, and a light emitting surface. The light emitting device provides the light beam. The lens module is disposed in a transmission path of the light beam and adjusts the light beam to be focused or dispersed. The reflection device receives the light beam passing from the lens module and reflects the light beam to the light emitting surface. The lens module includes a lens disposed in the transmission path of the light beam and moves relative to the light emitting device to adjust a viewing angle of the light emitting surface.

17 Claims, 6 Drawing Sheets

(51) Int. Cl.

| | | |
|---|---|---|
| *G02B 7/04* | (2006.01) | |
| *G02B 19/00* | (2006.01) | |
| *F21V 3/00* | (2015.01) | |
| *F21V 5/00* | (2018.01) | |
| *F21V 7/00* | (2006.01) | |
| *F21V 7/04* | (2006.01) | |
| *F21V 13/04* | (2006.01) | |
| *F21V 14/06* | (2006.01) | |
| *G02F 1/13357* | (2006.01) | |

(52) U.S. Cl.
CPC .............. *F21V 13/04* (2013.01); *F21V 14/06* (2013.01); *G02B 7/04* (2013.01); *G02B 19/0028* (2013.01); *G02B 19/0061* (2013.01); *G02F 1/133615* (2013.01); *H04N 9/31* (2013.01); *G02F 2001/133626* (2013.01)

(58) Field of Classification Search
CPC . F21V 13/02; F21V 13/12; F21V 7/04; G02B 6/0096; G02B 26/0875; G02B 26/0883; G02B 26/0891; G02B 7/04; G02B 19/0028; G02B 19/0061; H04N 9/31
See application file for complete search history.

(56) References Cited

U.S. PATENT DOCUMENTS

| | | | |
|---|---|---|---|
| 2010/0059767 A1* | 3/2010 | Kawasaki | G02B 6/0096 257/89 |
| 2011/0019057 A1 | 1/2011 | Hsiung | |
| 2012/0002137 A1* | 1/2012 | Saito | G02F 1/133615 349/64 |
| 2012/0105929 A1* | 5/2012 | Sung | G03H 1/2286 359/9 |
| 2015/0009653 A1* | 1/2015 | Dunn | G02F 1/133615 362/97.1 |
| 2015/0219823 A1* | 8/2015 | Takatori | G02B 6/0096 349/64 |
| 2017/0192305 A1* | 7/2017 | Kim | G02F 1/133504 |
| 2018/0143494 A1* | 5/2018 | Kim | G02F 1/133615 |

FOREIGN PATENT DOCUMENTS

| | | |
|---|---|---|
| CN | 203176908 | 9/2013 |
| CN | 203615246 | 5/2014 |
| CN | 105022187 | 11/2015 |
| JP | 5307134 | 10/2013 |
| TW | I386685 | 2/2013 |
| TW | 201612453 | 4/2016 |

* cited by examiner

LIGHT SOURCE MODULE AND DISPLAY APPARATUS

CROSS-REFERENCE TO RELATED APPLICATION

This application claims the priority benefit of Taiwan application serial no. 105125704, filed on Aug. 12, 2016. The entirety of the above-mentioned patent application is hereby incorporated by reference herein and made a part of this specification.

BACKGROUND OF THE INVENTION

Field of the Invention

The invention relates to an optical module and an optical apparatus, and particularly relates to a light source module and a display apparatus.

Description of Related Art

The conventional liquid crystal display includes the edge-lit type and the direct-lit type. The edge-lit liquid crystal display generally includes a light guide plate, a light emitting diode, a reflector, an optical film, and a liquid crystal panel, etc. The direct-lit liquid crystal display generally includes a light emitting diode, an optical film, and a liquid crystal panel, etc. Currently, the light viewing angle of these two types can not be adjusted arbitrarily. If the light viewing angle can not be adjusted arbitrarily, application of the liquid crystal display becomes poor on the occasion that the user needs to provide the requirements of the wide viewing angle or the narrow viewing angle with the high brightness. In the current technology, if taking the demands of the wide viewing angle and the high brightness into account, then it is necessary to increase the number of the light emitting diodes, or increase the driving current of the light emitting diode. However, it results in the increase of the cost and the power consumption.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a light source module and a display apparatus that the viewing angle of the light incident surface may be adjusted.

Other objects and advantages of the invention may be further illustrated by the technical features broadly embodied and described as follows.

In order to achieve at least one or a portion of or all of the objects or other objects, one embodiment of the invention provides a light source module including a light emitting device, a lens module and a first reflection device. The light emitting device is adapted to provide a light beam. The lens module is disposed in a transmission path of the light beam. The lens module is adapted to adjust the light beam to be focused or dispersed. The first reflection device is disposed in the transmission path of the light beam. The first reflection device is adapted to receive the light beam passing from the lens module, and reflect the light beam. The lens module includes a first lens. The first lens is disposed in the transmission path of the light beam. The first lens moves with respect to the light emitting device to adjust a viewing angle of the light incident surface.

In order to achieve at least one or a portion of or all of the objects or other objects, another embodiment of the invention provides a display apparatus including a display panel and a light source module. The display panel is adapted to display an image frame according to a light beam. The light source module is adapted to provide the light beam to the display panel. The light source module includes a light emitting device, a lens module, a first reflection device and a light incident surface. The light emitting device is adapted to provide the light beam. The lens module is disposed in a transmission path of the light beam. The lens module is adapted to adjust the light beam to be focused or dispersed. The first reflection device is disposed in the transmission path of the light beam. The first reflection device is adapted to receive the light beam passing from the lens module and reflect the light beam. The lens module includes a first lens. The first lens is disposed in the transmission path of the light beam. The first lens moves with respect to the light emitting device to adjust a viewing angle of the light incident surface.

In summary of the above, the embodiments of the invention may achieve at least one of the advantages or effects listed below. In the embodiment of the invention, moving the lens of the light source module and the display apparatus with respect to the light emitting device may adjust the viewing angle of the light incident surface.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
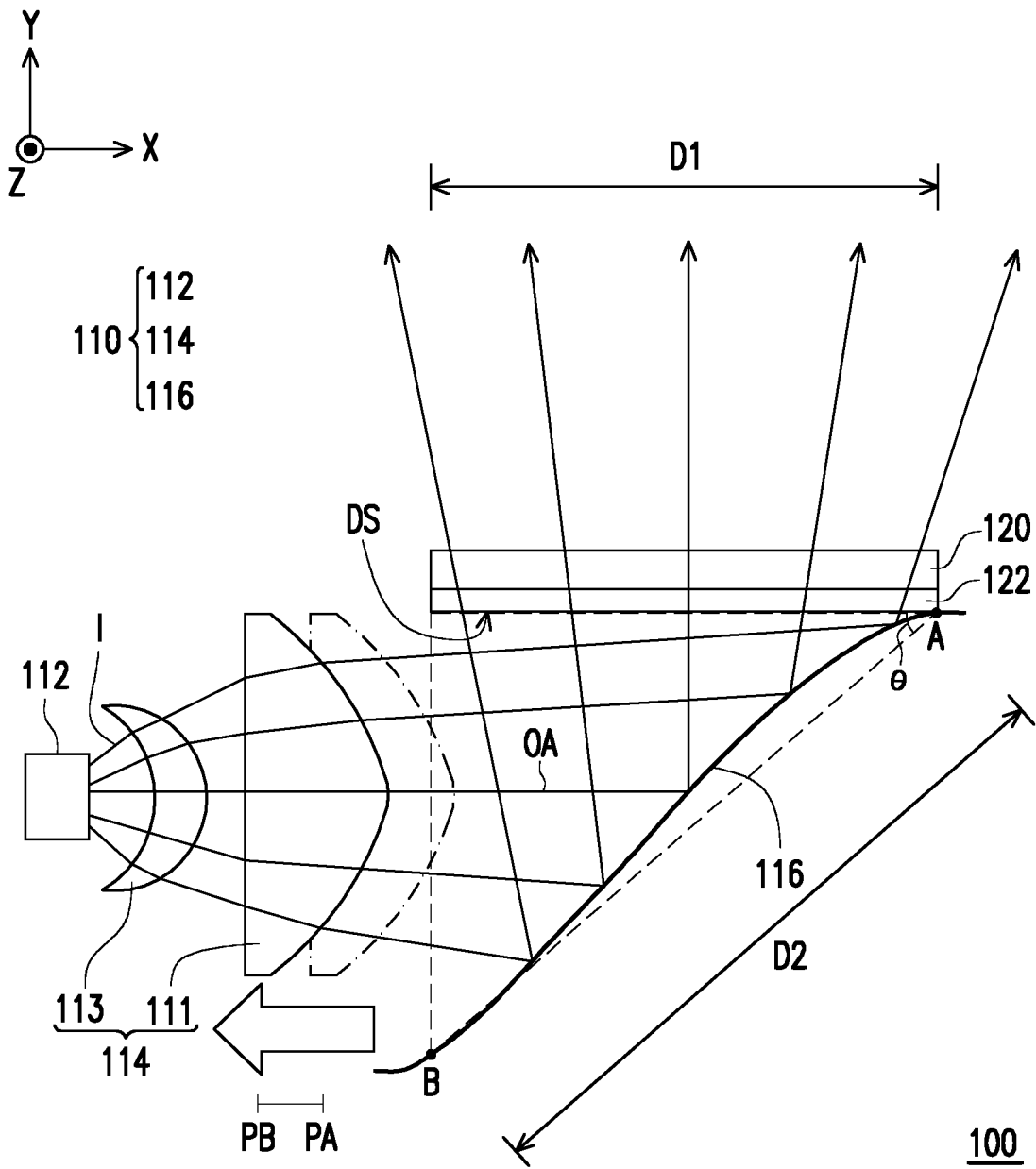
FIG. 1 is a side-view schematic diagram illustrating a display apparatus in a wide viewing angle mode of one embodiment of the invention.
Figure 2:
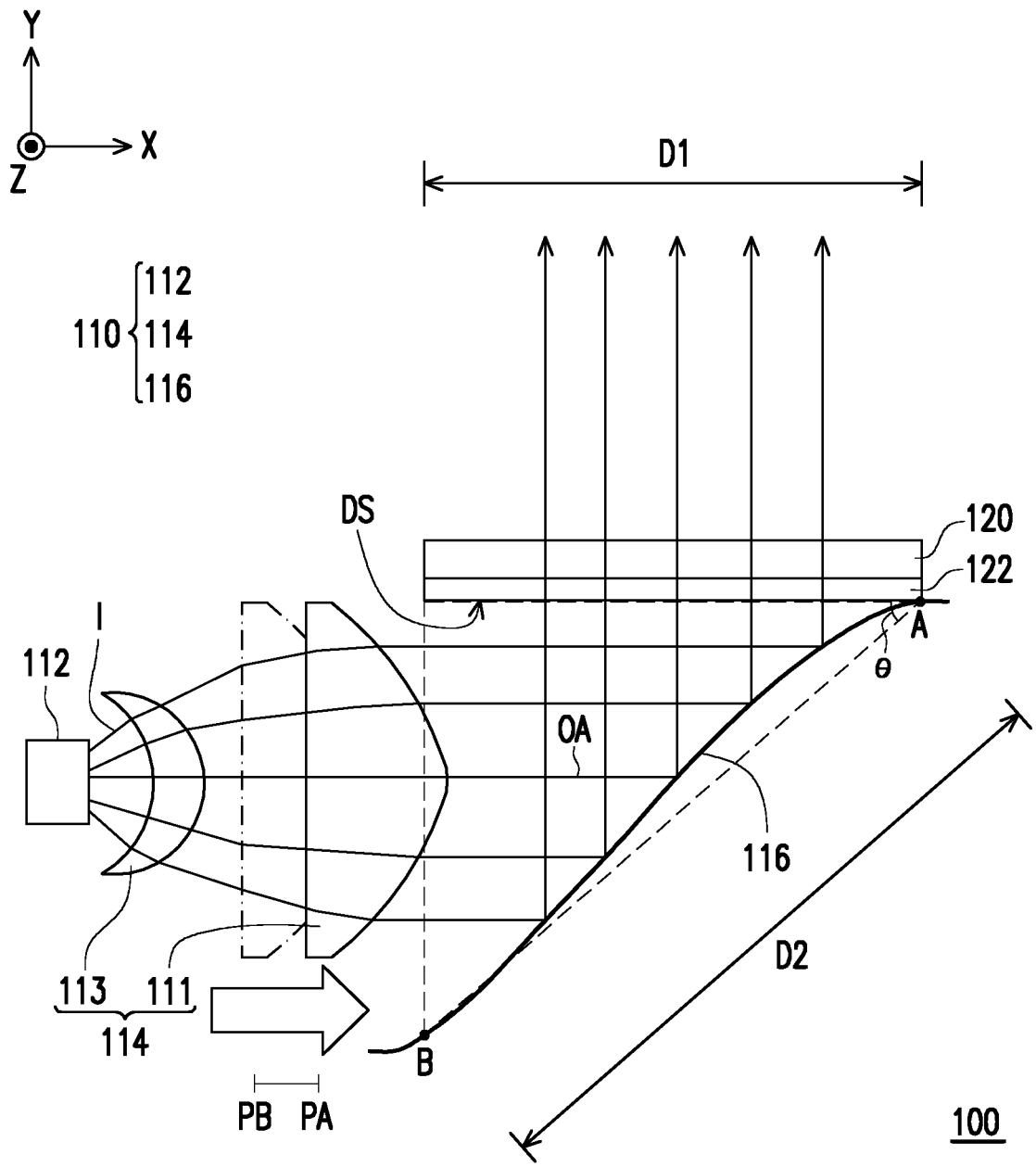
FIG. 2 is a side-view schematic diagram illustrating a display apparatus in a narrow viewing angle mode of the embodiment of FIG. 1.

FIG. 1 is a side-view schematic diagram illustrating a display apparatus in a wide viewing angle mode of one embodiment of the invention. FIG. 2 is a side-view schematic diagram illustrating a display apparatus in a narrow viewing angle mode of the embodiment of FIG. 1. Referring to FIG. 1 and FIG. 2, a display apparatus 100 of the embodiment includes a light source module 110 and a display panel 120. The light source module 110 is adapted to provide a light beam I to the display panel 120. The display panel 120 is adapted to display an image frame according to the light beam I.

In the embodiment, the light source module 110 includes a light emitting device 112, a lens module 114, a first reflection device 116 and a light incident surface DS of a diffusing device 122. The lens module 114 is disposed in a transmission path of the light beam I. In addition, the lens module 114 includes a first lens 111 and a second lens 113. The first lens 111 and the second lens 113 are disposed in the transmission path of the light beam I. The second lens 113 is located between the light emitting device 112 and the first lens 111. The first reflection device 116 is disposed in the transmission path of the light beam I. The first reflection device 116 is, for example, a reflector and, for instance, a free-form reflector. A space is surrounded by the lens module 114, the first reflection device 116 and the light incident surface DS. For instance, an approximately triangular space in view of the side-view schematic diagram of FIG. 1 is surrounded by the first lens 111, the first reflection device 116 and the light incident surface DS.

In the embodiment, the light emitting device 112 is adapted to provide the light beam I. The light emitting device 112 is, for example, a single light emitting diode, a light emitting diode array or one or a plurality of light emitting diode strings. Herein, when the light emitting device 112 is a light emitting diode array, a plurality of light emitting diodes are arranged along the direction Z. However, the invention is not limited to the types of the light emitting device 112 hereto. The lens module 114 is adapted to adjust the light beam I to be focused or dispersed. For instance, the second lens 113 is adapted to receive the light beam I emitting from light emitting device 112 and transmit the light beam I to the first lens 111. The first reflection device 116 is adapted to receive the light beam I passing from the first lens 111 and reflect the light beam I to the light incident surface DS, and then transmit the light beam I to the display panel 120. In the embodiment, the first lens 111 moves with respect to the light emitting device 112 in the optical axis OA to adjust the viewing angle of the light incident surface DS.

To be more specific, in FIG. 2, compared to FIG. 1, the configuration position of the first lens 111 (such as the first position PA) is far away from the light emitting device 112. Therefore, the display apparatus 100 may provide a narrower viewing angle. Furthermore, in the embodiment, when the display apparatus 100 is adjusted from the wide viewing angle mode of FIG. 1 to the narrow viewing angle mode of FIG. 2, the first lens 111 moves with respect to the light emitting device 112 in the optical axis OA. For example, the first lens 111 moves from the second position PB to the first position PA which is away from the light emitting device 112. The viewing angle of the light incident surface DS is changed from the first viewing angle of FIG. 1 to the second viewing angle of FIG. 2. In addition, the first viewing angle of FIG. 1 is greater than the second viewing angle of FIG. 2. On the contrary, in FIG. 1, compared to FIG. 2, the configuration position of the first lens 111 (such as the second position PB) is closer to the light emitting device 112. Therefore, the display apparatus 100 may provide a wider viewing angle. Furthermore, in the embodiment, when the display apparatus 100 is adjusted from the narrow viewing angle mode of FIG. 2 to the wide viewing angle mode of FIG. 1, the first lens 111 moves with respect to the light emitting device 112 in the optical axis OA. For example, the first lens 111 moves from the first position PA to the second position PB which is close to the light emitting device 112. The viewing angle of the light incident surface DS is changed from the third viewing angle of FIG. 2 to the fourth viewing angle of FIG. 1. In addition, the third viewing angle of FIG. 2 is less than the fourth viewing angle of FIG. 1.

Hence, in the embodiment, the first lens 111 may move from the first position PA to the second position PB in the optical axis OA, or move from the second position PB to the first portion PA, or move on the optical axis OA and be configured on any position between the first position PA and the second position PB to adjust the viewing angle of the light incident surface DS.

In the embodiment, the light incident surface DS has a width D1 along the direction X. The first reflection device 116 has a first end A close to the light incident surface DS and a second end B away from the light incident surface DS. A connection line between the first end A and the second end B has a length D2. In the embodiment, an included angle θ exists between the first reflection device 116 and the light incident surface DS. That is to say, the included angle θ exists between the connection line between the first end A and the second end B of the first reflection device 116 and the light incident surface DS as shown in FIG. 1 and FIG. 2. The included angle θ ranges from 0 degree to 90 degrees. To be more specific, the included angle θ is, for example, greater than 0 degree and less than 90 degrees. Then, the first reflection device 116 may reflect the light beam I to the light incident surface DS. In more detail, the first reflection device 116 is easier to be manufactured when the included angle θ ranges from 5 degrees to 75 degrees, to increase the utilization efficiency of the light beam I reflecting to the light incident surface DS. Herein, in the embodiment, the included angle θ is, for example, 41 degrees. Moreover, in the embodiment, D2/D1 which is the ratio of D2 and D1, is 1/cos θ. To be more specific, if the width D1 of the light incident surface DS is known, to achieve the effect of the thinner display apparatus, it only needs to adjust the surface design of the first reflection device 116 of the free-form reflector, then the length D2 and the included angle θ may be adjusted to make D2/D1 become 1/cos θ, and then the aforementioned effect may be achieved.

The diffusing device 122 is disposed in the transmission path of the light beam I and located between the display panel 120 and the first reflection device 116. The diffusing device 122 is adapted to adjust the light emitting quality of the light beam I and also project the light beam I to the display panel 120. The diffusing device 122 is, for example, a diffusing sheet or a diffusing film, but the invention is not limited thereto. The display panel 120 displays the image frame according to the light beam I. Herein, the display panel 120 is, for example, the liquid crystal panel, but the invention is not limited thereto.

Therefore, in the light source module 110 of the embodiment, the second lens 113 used for collecting the light beam is disposed in front of the light emitting device 112, so that most of the light beam I emitting from the light emitting device 112 may be incident to the first lens 111, to increase the utilization efficiency of the light beam I. The first lens 111 used for adjusting the focus of the light beam is disposed in front of the second lens 113 to adjust the light beam which is incident to the first reflection device 116 to achieve the dispersion and focus effect of the light beam I. In addition, in the light source module 110 of the embodiment, the first reflection device 116 of the free-form reflector is disposed in front of the first lens 111 to make the light beam I turn from the direction X toward the direction Y. Moreover, combining with the surface design of the first reflection device 116, the distribution uniformity of the light beam I may be further adjusted. The diffusing device 122 is disposed perpendicular to light-emitting direction (the direction Y) of the light incident surface DS and used for adjusting the light-emitting quality. Moreover, the display panel 120 is disposed on the diffusing device 122. Therefore, in the embodiment, adjusting the first lens 111 to move left or right (with respect to the position of the light emitting device 112) may adjust the light beam I to be dispersed or focused, thereby changing the viewing angle of the display apparatus 100.

Figure 3:
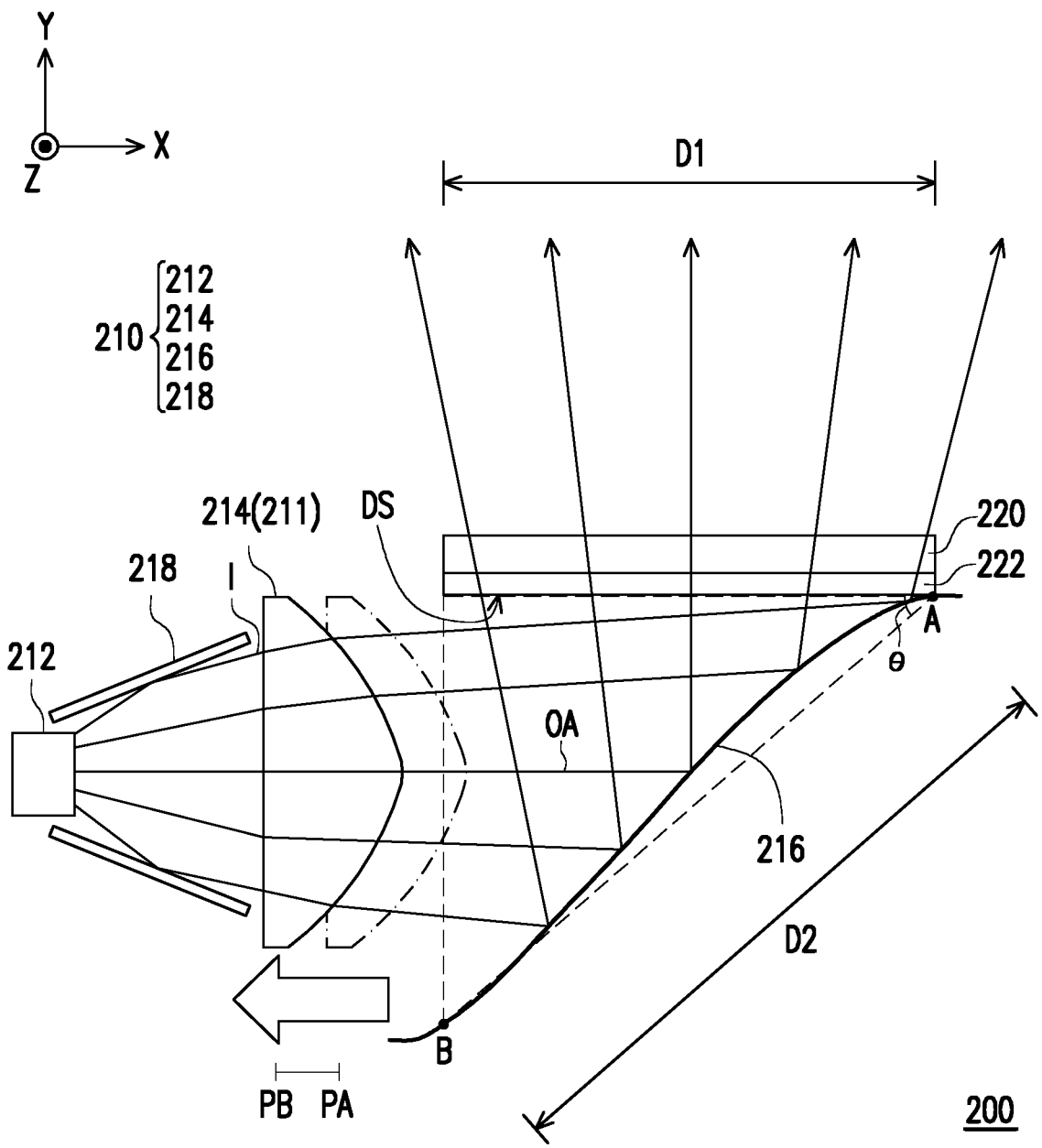
FIG. 3 is a side-view schematic diagram illustrating a display apparatus in a wide viewing angle mode of another embodiment of the invention.
Figure 4:
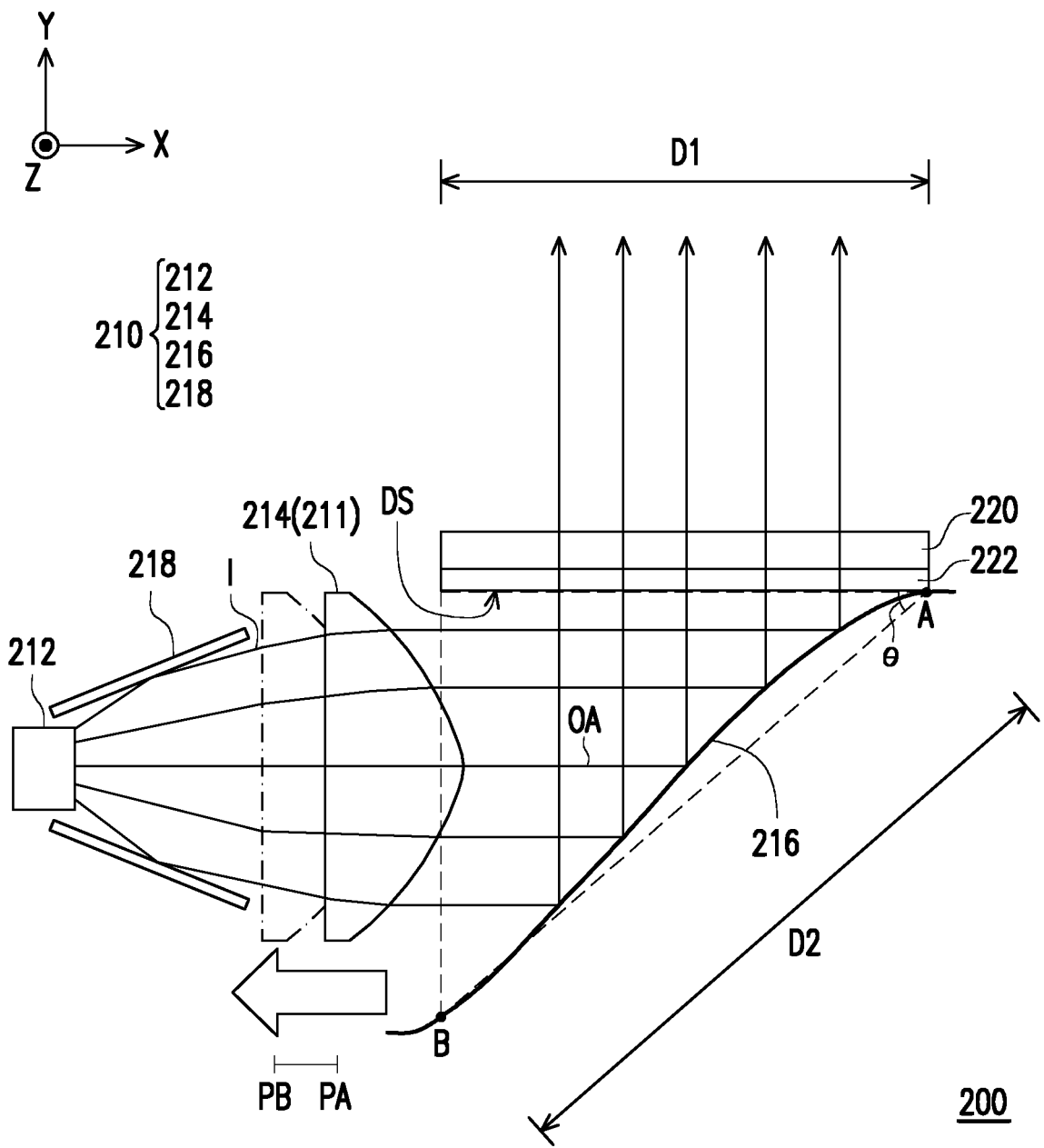
FIG. 4 is a side-view schematic diagram illustrating a display apparatus in a narrow viewing angle mode of the embodiment of FIG. 3.

FIG. 3 is a side-view schematic diagram illustrating a display apparatus in a wide viewing angle mode of another embodiment of the invention. FIG. 4 is a side-view schematic diagram illustrating a display apparatus in a narrow viewing angle mode of the embodiment of FIG. 3. Referring to FIG. 3 and FIG. 4, a display apparatus 200 of the embodiment is similar to the display apparatus 100 of the embodiment in FIG. 1 and FIG. 2, but the main difference between the display apparatus 200 and the display apparatus 100 lies in, for example, the display apparatus 200 further includes a second reflection device 218, and the lens module 214 includes the first lens 211. Herein, in the embodiment, the included angle θ is, for example, 41 degrees.

To be more specific, in the embodiment, the second reflection device 218 is disposed between the light emitting device 212 and the first lens 211 of the lens module 214. The second reflection device 218 is adapted to reflect the light beam I emitting from the light emitting device 212 to the first lens 211. Therefore, in the light source module 210 of the embodiment, the second reflection device 218 is disposed around in front of the light emitting device 212, as a reflector used for collecting the light beam (in particular the wide-angled light beam) of the light emitting device 212, so that the wide-angled light beam may be transmitted to the first lens 211 to increase the light utilization efficiency of the light beam I. The first lens 211 used for adjusting the focus of the light beam is disposed in front of the second reflection device 218, to adjust the light beam incident to the first reflection device 216 and further achieve the dispersion and focus effect of the light beam I. In addition, in the light source module 210 of the embodiment, the first reflection device 216 of the free-form reflector is disposed in front of the first lens 211 to make the light beam I turn from the direction X toward the direction Y. Moreover, combining with the surface design of the first reflection device 216, the distribution uniformity of the light beam I may be further adjusted. A diffusing device 222 is disposed perpendicular to light-emitting direction (the direction Y) of the light incident surface DS and used for adjusting the light-emitting quality. Moreover, the display panel 220 is disposed on the diffusing device 222. Therefore, in the embodiment, adjusting the first lens 211 to move left or right (with respect to the position of the light emitting device 212) may adjust the light beam I to be dispersed or focused, thereby changing the viewing angle of the display apparatus 200.

In addition, enough teaching, suggestion, and implementation illustration for the device configuration structure and the operation method of the display apparatus may be obtained with reference from the embodiment of FIG. 1 to FIG. 2, which is not repeated hereinafter.

In the embodiment of FIG. 1 to FIG. 4, even if it is illustrative by fixing the light emitting device and moving the first lens with respect to the light emitting device, but the invention is not limited thereto. In other embodiment, it may fix the first lens and move the light emitting device with respect to the first lens to adjust the viewing angle of the display apparatus. Those skilled in the art may learn enough instructions, recommendations and implementation description for the operation method thereof from general knowledge of the related technical field, so detailed description thereof is not repeated.

Figure 5:
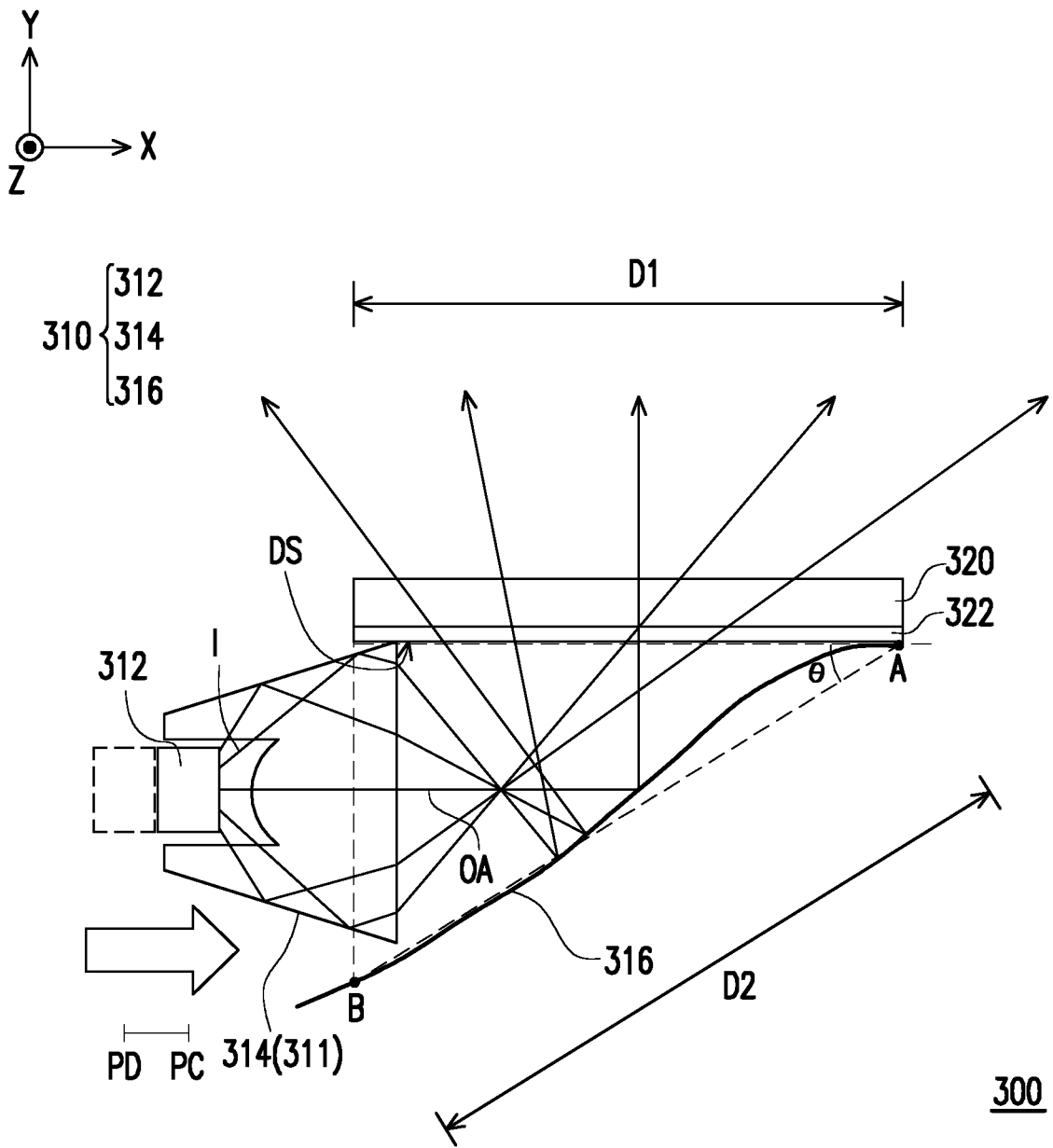
FIG. 5 is a side-view schematic diagram illustrating a display apparatus in a wide viewing angle mode of another embodiment of the invention.
Figure 6:
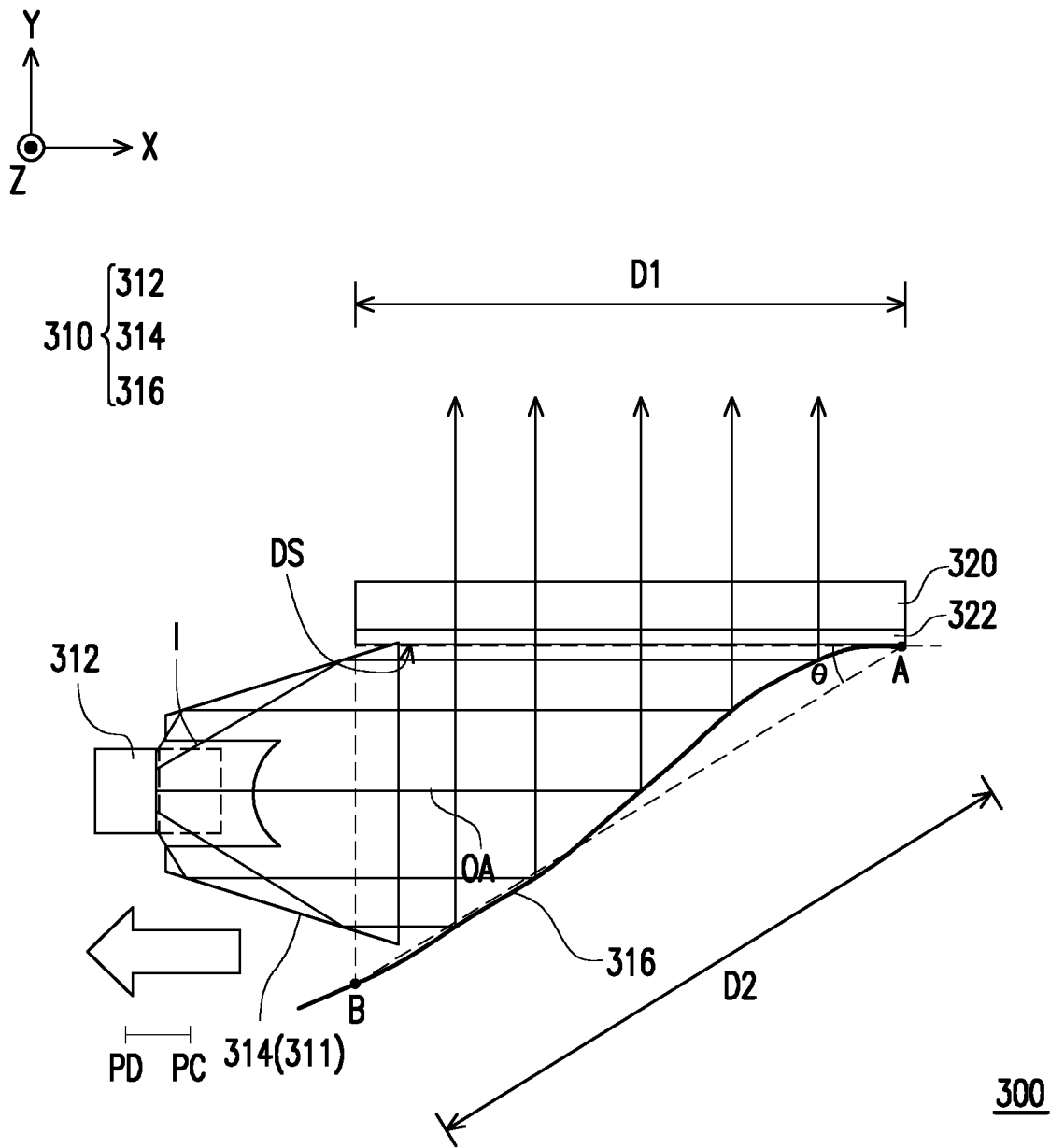
FIG. 6 is a side-view schematic diagram illustrating a display apparatus in a narrow viewing angle mode of the embodiment of FIG. 5.

FIG. 5 is a side-view schematic diagram illustrating a display apparatus in a wide viewing angle mode of another embodiment of the invention. FIG. 6 is a side-view schematic diagram illustrating a display apparatus in a narrow viewing angle mode of the embodiment of FIG. 5. Referring to FIG. 5 and FIG. 6, a display apparatus 300 of the embodiment is similar to the display apparatus 100 of the embodiment in FIG. 1 and FIG. 2, but the main difference between the display apparatus 300 and the display apparatus 100 lies in, for example, the first lens 311 is a total internal reflection lens and the display apparatus 300 uses the first lens 311 to fix, and the light emitting device 312 moves with respect to the first lens 311 to adjust its viewing angle of the light incident surface. Herein, in the embodiment, the included angle θ is, for example, 32 degrees.

To be more specific, in the embodiment, in FIG. 6, compared to FIG. 5, the configuration position of the light emitting device 312 (such as the fourth position PD) is far away from the first lens 311. Therefore, the display apparatus 300 may provide a narrower viewing angle. Furthermore, in the embodiment, when display apparatus 300 is adjusted from the wide viewing angle mode of FIG. 5 to the narrow viewing angle mode of FIG. 6, the light emitting device 312 moves with respect to the first lens 311 in the optical axis OA. For example, the light emitting device 312 moves from the third position PC to the fourth position PD which is away from the first lens 311. The viewing angle of the light incident surface DS is changed from the first viewing angle of FIG. 5 to the second viewing angle of FIG. 6. In addition, the first viewing angle of FIG. 5 is greater than the second viewing angle of FIG. 6. On the contrary, in FIG. 5, compared to FIG. 6, the configuration position of the light emitting device 312 (such as the third position PC) is closer to the first lens 311. Therefore, the display apparatus 300 may provide a wider viewing angle. Furthermore, in the embodiment, when the display apparatus 300 is adjusted from the narrow viewing angle mode of FIG. 6 to the wide viewing angle mode of FIG. 5, the light emitting device 312 moves with respect to the first lens 311 in the optical axis OA. For example, the light emitting device 312 moves from the fourth position PD to the third position PC which is close to the first lens 311. The viewing angle of the light incident surface DS is changed from the third viewing angle of FIG. 6 to the fourth viewing angle of FIG. 5. The third viewing angle is less than the fourth viewing angle.

Hence, in the embodiment, the light emitting device 312 may move from the third position PC to the fourth position PD in the optical axis OA, or move from the fourth position PD to the third portion PC, or move in the optical axis OA and be configured on any position between the third position PC and the fourth position PD to adjust the viewing angle of the light incident surface DS.

In the embodiment, the first lens 311 of the total internal reflection lens is disposed in front of the light emitting device 312 and used for collecting the light beam I emitting from the light emitting device 312, and also as the optical device which may adjust the focus of the light beam. In addition, in the light source module 310 of the embodiment, the first reflection device 316 of the free-form reflector is disposed in front of the total internal reflection lens to make the light beam I turn from the direction X toward the light-emitting direction Y. Moreover, combining with the surface design of the first reflection device 316, the distribution uniformity of the light beam I may be further adjusted. Herein, due to the surface design of the first reflection device 316, the included angle θ is, for example, 32 degrees. The diffusing device 322 is disposed perpendicular to light-emitting direction (the direction Y) of the light incident surface DS and used for adjusting the light emitting quality. Moreover, the display panel 320 is disposed on the diffusing device 322. Therefore, in the embodiment, adjusting the light emitting device 312 to move left or right (with respect to the position of the first lens 311) may adjust the light beam I to be dispersed or focused, thereby changing the viewing angle of the display apparatus 300.

In addition, enough teaching, suggestion, and implementation illustration for the device configuration structure and implementation of display apparatus may be obtained with reference from the embodiment of FIG. 1 to FIG. 4, which is not repeated hereinafter.

In summary of the above, the embodiments of the invention have at least one of the advantages or effects below. In the embodiment of the invention, moving the lens of the light source module and the display apparatus with respect to the light emitting device may adjust the viewing angle of the light incident surface and also improve the problem that the conventional display apparatus only has the fixed single viewing angle. The user may adjust the viewing angle of the display apparatus according to the environment to take both brightness adjustment and invisibility of the display apparatus into account, thereby saving the usage of the light source.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
a light emitting device, providing a light beam;
a lens module, disposed in a transmission path of the light beam, and adapted to adjust the light beam between a focused and dispersed light distribution;
a first reflection device, disposed in the transmission path of the light beam, and adapted to receive the light beam passing from the lens module and reflect the light beam; and
a diffusing device having a light incident surface,
wherein the lens module comprises a first lens disposed in the transmission path of the light beam, and the first lens moves with respect to the light emitting device to adjust a viewing angle of the light incident surface of the light source module.

2. The light source module as claimed in claim 1, wherein when the first lens is moved away from the light emitting device, the viewing angle of the light incident surface of the light source module is changed from a wide viewing angle to a narrow viewing angle.

3. The light source module as claimed in claim 1, wherein when the first lens is moved close to the light emitting device, the viewing angle of the light incident surface of the light source module is changed from a narrow viewing angle to a wide viewing angle.

4. The light source module as claimed in claim 1, wherein the lens module further comprises a second lens, disposed in the transmission path of the light beam, and located between the light emitting device and the first lens, and the second lens receives the light beam and transmits the light beam to the first lens.

5. The light source module as claimed in claim 1, further comprising a second reflection device, disposed between the light emitting device and the lens module, and adapted to reflect the light beam to the first lens.

6. The light source module as claimed in claim 1, wherein the first reflection device is a free-form reflector.

7. The light source module as claimed in claim 1, wherein a projection of the first reflection device on a plane perpendicular to an optical axis of the lens module has a first end close to the light incident surface and a second end away from the light incident surface, wherein a first straight line passes through the first end and the second end, an included angle θ exists between the first straight line and the light incident surface, and the included angle θ falls within a range from 0 degree to 90 degrees.

8. The light source module as claimed in claim 7, wherein the light incident surface of the diffusing device has a width D1, a length of the first straight line is D2, and D2/D1 is 1/cos θ.

9. A display apparatus, comprising:
a display panel, adapted to display an image frame according to a light beam; and
a light source module, adapted to provide the light beam to the display panel, wherein the light source module comprises a light emitting device, a lens module, a first reflection device, and a diffusing device having a light incident surface, the light emitting device provides the light beam, the lens module is disposed in a transmission path of the light beam and adapted to adjust the light beam between a focused and dispersed light distribution, the first reflection device is disposed in the transmission path of the light beam, and the first reflection device is adapted to receive the light beam passing from the lens module and reflect the light beam, wherein the lens module comprises a first lens, disposed in the transmission path of the light beam, and the first lens moves with respect to the light emitting device to adjust a viewing angle of the light incident surface of the light source module.

10. The display apparatus as claimed in claim 9, wherein when the first lens is moved away from the light emitting device, the viewing angle of the light incident surface of the light source module is changed from a wide viewing angle to a narrow viewing angle.

11. The display apparatus as claimed in claim 9, wherein when the first lens is moved close to the light emitting device, the viewing angle of the light incident surface of the light source module is changed from a narrow viewing angle to a wide viewing angle.

12. The display apparatus as claimed in claim 9, wherein the lens module further comprises a second lens disposed in the transmission path of the light beam, and located between the light emitting device and the first lens, and the second lens receives the light beam, and transmits the light beam to the first lens.

13. The display apparatus as claimed in claim 9, wherein the light source module further comprises a second reflection device disposed between the light emitting device and the lens module, and adapted to reflect the light beam to the first lens.

14. The display apparatus as claimed in claim 9, wherein the first reflection device is a free-form reflector.

15. The display apparatus as claimed in claim 9, wherein a projection of the first reflection device on a plane perpendicular to an optical axis of the lens module has a first end close to the light incident surface and a second end away from the light incident surface, wherein a first straight line passes through the first end and the second end, an included angle θ exists between the first straight line and the light incident surface, and the included angle θ falls within a range from 0 degree to 90 degrees.

16. The display apparatus as claimed in claim 15, wherein the light incident surface of the diffusing device has a width D1, a length of the first straight line is D2, and D2/D1 is 1/cos θ.

17. The display apparatus as claimed in claim 9, further comprising a diffusing device disposed in the transmission path of the light beam, and located between the display panel and the first reflection device.

* * * * *